United States Patent Office 3,157,625
Patented Nov. 17, 1964

3,157,625
FREE-RADICAL CURE OF ETHYLENE-PROPYL-
ENE COPOLYMER RUBBER WITH SUPPORTED
NITROGEN OXIDE AS A PROMOTER
Edwin T. Yates, Highland Park, and Harold K. Garner,
Wayne, N.J., assignors to United States Rubber Com-
pany, New York, N.Y., a corporation of New Jersey
No Drawing. Filed July 12, 1962, Ser. No. 209,318
3 Claims. (Cl. 260—88.2)

This invention relates to a method of curing ethylene/propylene elastomers, and more particularly it relates to a method of assisting the free-radical cure of rubbery copolymers of ethylene and propylene, by a nitrogen oxide.

It has been known for some time that numerous materials improve the vulcanization of rubbery high polymers by free-radical sources. Robinson et al., in Canadian Patent 599,198, May 31, 1960, describe the improvement in the physical properties of rubbery propylene copolymer vulcanizates cured by the joint action of a free-radical source, such as dicumyl peroxide, and a dinitroso compound, such as N-methyl-N,4-dinitrosoaniline.

Our invention is based on the discovery that the use of nitric oxide or nitrogen dioxide in conjunction with an organic peroxide produces an excellent cure of saturated ethylene/propylene copolymer rubbers. The fact that these oxides of nitrogen do aid in the free-radical cross-linking of these saturated hydrocarbon rubbers is surprising since the prior art appears to emphasize the importance of there being an organic moiety in the nitroso compounds. Also, Kharasch et al., Ind. Eng. Chem. 39, 830 (1947), suggest that nitrogen dioxide destroys peroxides. Therefore, it was most unexpected to find that the oxides of nitrogen would not inhibit the cross-linking reaction, but enhance it.

In the practice of our invention we prefer to use the oxide of nitrogen adsorbed or absorbed on or in a solid, finely divided support. The supports used may include, by way of examples, aluminosilicates in the form of molecular sieves, carbon black fillers commonly used in rubber compounding, and rubber-grade silica. Hersh, "Molecular Sieves," Reinhold, New York, 1961, at the preface and at page 3, describes Linde molecular sieves as synthetic, crystalline metal aluminosilicates. Hi-Sil is an example of a very fine particle size hydrated silica, described in Bulletin No. 4 of Columbia Southern Chemical Corporation, dated April 1960.

Examples of the molecular sieves which may be used in the invention are described in the following references:

(1) "Sequestration of Molecules With Aid of Crystal Sieves," by R. M. Banner, in Brennstoff-Chem., 35, 325 (1954).

(2) "Zeolites as Absorbents and Molecular Sieves," by R. M. Banner, Ann. Reports, 41, 31 (1944).

(3) "Inclusion Complexes of Faujasite With Paraffins and Permanent Gases," by Banner and Sutherland, Proc. Roy. Soc., 237, 439 (1956).

The rubbers may contain the usual type of rubber fillers such as carbon blacks, silicates, etc., and age-improvers, oils and other common ingredients.

To impregnate the support with the oxide of nitrogen, a weighted amount of the support is placed in a vacuum desiccator, the pressure is reduced by use of a vacuum pump, then the oxide of nitrogen is bled in until the pressure is about 5 centimeters less than the prevailing atmospheric pressure. The gas is rapidly absorbed, i.e., as fast as it is admitted, so that the time required is not critical and is a matter of convenience. This is true for all the substrates. In this way the compositions listed in the table below were prepared.

| Oxide of Nitrogen | Support | Percent Oxide of Nitrogen by weight (based on the weight of the support plus gas) | Promoter Identification |
|---|---|---|---|
| $NO_2$ | Hi-Sil | 6.81 | I. |
| NO | Linde 13X Sieve* | 2.89 | II. |
| NO | Carbon Black | 1.81 | III. |
| $NO_2$ | Coconut Charcoal | 40.14 | IV. |

*Faujasite which has the composition expressed in terms of oxides as $Na_2O_3 : Al_2O_3 : 2.67SiO_2 : 2H_2O$ and which has a free diameter in channels of about 12 angstroms.

The thus-prepared material is thereafter handled and stored under an argon atmosphere until it is ready to be added to the poly(ethylene/propylene) rubber. It is added to the rubber, along with the free-radical curative and filler, on a standard two-roll mill or in a Banbury type mixer, and the cures are made in conventional curing presses.

The rubbery ethylene/propylene copolymers actually used had intrinsic viscosities, in cyclohexane at 30° C., of from 4.0 to 6.9. The propylene content varied from 65 to 70 percent by weight. However, any rubbery copolymer of ethylene/propylene is satisfactory, including those containing from 40 to 80% propylene.

The temperature for the cross-linking is that which is required to generate the free-radical from the chosen source at a useful rate. The half-life for a number of peroxides is given by Doenhnert and Mageli, Modern Plastics, 36, [6] 142 (1959) and is helpful in choosing a suitable temperature range for members of this class of free-radical sources. Generally, the peroxide appropriately has a half-life of at least five minutes at 275° F., but less than one hour at 375° F.

Sources of free-radicals are well known in the art and are described, for example, in Canadian Patent 599,198 referred to above.

Thus, as free-radical generators there may be used organic or inorganic compounds which break down under the influence of heat, friction, irradiation with ultraviolet, X-rays, or rays emanating from radioactive materials. Free-radicals may also be produced directly from the materials to be coupled by the action of oxidizing agents, ultraviolet, X-rays, or gamma radiation emanating from radioactive sources.

The free-radical generators of an organic or inorganic nature which may be used include peroxides, hydroperoxides (e.g., tertiary butyl hydroperoxide), peracids (e.g. peracetic acid). Specific free-radical generators include materials heretofore known as polymerization catalysts for polymerization of olefins and olefinic compounds. Organic free-radical generators include the following symmetrical or bis(aralkyl) and bis(alkyl) peroxides: dibenzyl peroxide, bis(alpha-methylbenzyl) peroxide, bis (alpha,alpha-dimethylnaphthylmethyl) peroxide, bis(alpha,alpha-dimethyl-p-methylbenzyl) peroxide, bis(alpha, alpha-dimethyl-p-isopropylbenzyl) peroxide, and di-tert-butyl peroxide.

Unsymmetrical peroxides useful in the invention include the following compounds: benzyl (alpha-methylbenzyl) peroxide, benzyl (alpha-methyl-p-methylbenzyl) peroxide, benzyl (alpha-methyl-p-isopropylbenzyl) peroxide, and tert-butyl (alpha, alpha-dimethylbenzyl) peroxide.

Other well known organic catalysts useful in this invention include benzoyl peroxide, acetyl peroxide, lauroyl peroxide, tert-butyl perbenzoate, and ascaridole. Moreover, peroxides of the polymer such as are produced by oxidation with air, hydrogen peroxide, sodium persulfate, or alkali or alkaline earth peroxides (e.g. sodium peroxide) on heating form initiating free-radicals in the process of this invention. Other free-radical formers are the azo compounds such as alpha, alpha-azobis (isobutyronitrile).

The cross-linking temperature depends on the source of free-radicals since elevated temperatures are not required for cross-linking and are used only when required for the creation of free-radicals from the free-radical generator, or when the polymer is subjected to molding conditions during the cross-linking process. When heat is used to develop free-radicals from diaralkyl peroxides a temperature in the range of 270–480° F. is preferred. When means other than heat is used to develop the free-radicals in the system, temperatures as low as about −10° F. may be used. The temperature during cross-linking may thus be anywhere in the range of about −10° F. to about 480° F. and the temperature is selected according to the need with respect to free-radical generation, molding or the like.

We strongly prefer the organic peroxides, especially the di-tert-alkyl peroxides, which term includes dicumyl peroxide, since these are readily available and are the most practical.

The free-radical source is used in the amount required, in combination with the promoter of the invention, i.e., the nitrogen oxide, to impart the desired physical properties to the rubber. Generally, these will be used in relatively minor amounts compared to the weight of the rubber. From about .5 to 20 parts of peroxide per 100 of rubber can be used. However, one will usually use from about 1 to about 10 parts per 100 of rubber. The amount of the oxide of nitrogen to be used depends also upon the degree of cure desired and is not critical. About .05 to 10 parts by weight per 100 of the rubber is satisfactory. Usually, an amount in the lower part of this range is adequate, e.g., from about .1 to about 5 parts per 100 of rubber.

Satisfactory results are usually obtained by heating the mixture at a temperature of from about 265° F. to about 480° F. for a period of time ranging from about one minute to about five hours. Usually, the time and temperature will be inversely related, and the exact combination of time and temperature of cure will depend upon such variables as the extent of cure desired, the size of the article, the concentration of curing agents, the particular curing agents employed, the character of the heating device, etc.

The following examples illustrate the invention in more detail.

Example I

This example illustrates the use of nitrogen dioxide on a silica support as a promoter (identified above as "Promoter I") for the curing of ethylene/propylene rubber by dicumyl peroxide. The promoter may be prepared by placing a weighed quantity of silica (in an open dish) in a vacuum desiccator, evacuating the desiccator and then bleeding in nitrogen dioxide until the pressure is about 5 centimeters less than the prevailing atmospheric pressure, as described previously. The silica is thereafter removed and weighed again and is found to have increased in weight by 6.81%, i.e., $$100 \times \frac{\text{Wt. of gas absorbed}}{\text{Wt. of gas absorbed} + \text{wt. of silica}} = 6.81\%$$

| Materials | Parts by Weight | |
|---|---|---|
| | Mix A (Control) | Mix B (Invention) |
| Ethylene/propylene copolymer rubber (67% propylene) | 100 | 100 |
| Carbon black | 50 | 50 |
| Dicumyl peroxide (40% active) | 7 | 7 |
| Promoter I (described above) | | 2.8 |
| Hi-Sil | 2.6 | |

| Cure Time at 320° F. (min.) | 15 | 30 | 60 | 15 | 30 | 60 |
|---|---|---|---|---|---|---|
| Properties: | | | | | | |
| Tensile, p.s.i. | 975 | 1,035 | 995 | 2,150 | 2,216 | 2,140 |
| Elongation at break, percent | 595 | 590 | 585 | 535 | 515 | 525 |
| Modulus at 300%, p.s.i. | 380 | 400 | 370 | 725 | 810 | 755 |

The data show that the presence of the $NO_2$ greatly enhances the state of cure.

Example II

This example demonstrates the use of nitric oxide on molecular sieves for promoting the cure of ethylene/propylene rubbers by a source of free-radicals.

| Materials | Parts by Weight | |
|---|---|---|
| | Mix C (Control) | Mix D (Invention) |
| Ethylene/propylene (70% propylene) rubber | 100 | 100 |
| Carbon black | 50 | 50 |
| Dicumyl peroxide (40% active) | 7 | 7 |
| Promoter II (described above) | | 11.8 |
| Linde 13% molecular sieves | 11.4 | |

| Cure Time at 320° F. (min.) | 15 | 30 | 60 | 15 | 30 | 60 |
|---|---|---|---|---|---|---|
| Properties: | | | | | | |
| Tensile, p.s.i. | 820 | 1,090 | 1,100 | 1,965 | 1,840 | 2,075 |
| Elongation at break, percent | 545 | 505 | 500 | 470 | 410 | 450 |
| Modulus at 300%, p.s.i. | 420 | 530 | 545 | 910 | 1,075 | 1,050 |

It can be seen that stock D, containing the nitric oxide, has reached a much more useful state of cure than has control stock C.

Example III

This example demonstrates the use of nitric oxide on carbon black for advancing the state of cure of ethylene/propylene elastomer by the free-radical source, dicumyl peroxide.

| Materials | Parts by Weight | |
|---|---|---|
| | Mix E (Control) | Mix F (Invention) |
| Ethylene/propylene (70% propylene) elastomer | 100 | 100 |
| Carbon black | 56.5 | 50 |
| Dicumyl peroxide | 7 | 7 |
| Promoter III (described above) | | 6.6 |

| Cure Time at 320° F. (min.) | 15 | 30 | 60 | 15 | 30 | 60 |
|---|---|---|---|---|---|---|
| Properties: | | | | | | |
| Tensile, p.s.i. | 720 | 1,035 | 1,125 | 1,565 | 1,820 | 1,855 |
| Elongation at break, percent | 555 | 490 | 495 | 575 | 460 | 460 |
| Modulus at 300%, p.s.i. | 420 | 560 | 600 | 660 | 910 | 935 |

Higher amounts of promoter III than used in mix F give a still further increase in tensile and modulus, with only a moderate reduction in elongation.

Example IV

This example demonstrates the use of nitrogen dioxide impregnated in coconut charcoal for promoting the free-radical cross-linking of ethylene/propylene rubber.

| Materials | Parts by Weight | |
|---|---|---|
| | Mix G (Control) | Mix H (Invention) |
| Ethylene/propylene (67% propylene) rubber | 100 | 100 |
| Carbon black | 50 | 50 |
| Dicumyl peroxide (40% active) | 7 | 7 |
| Promoter IV (described above) | | 0.5 |
| Coconut charcoal | 0.3 | |

| Cure Time at 320° F. (min.) | 15 | 30 | 60 | 15 | 30 | 60 |
|---|---|---|---|---|---|---|
| Properties: | | | | | | |
| Tensile, p.s.i. | 1,315 | 1,530 | 1,500 | 1,930 | 1,750 | 1,840 |
| Elongation at break, percent | 510 | 500 | 490 | 470 | 390 | 415 |
| Modulus at 300%, p.s.i. | 535 | 635 | 625 | 815 | 1,040 | 1,000 |

It is seen that stock H, which contains nitrogen dioxide, has reached a much more useful state of cure than has control stock G, for the same cure times.

The method of the invention is useful in making fabricated or shaped articles of all sorts, partly or entirely from ethylene/propylene rubber. Thus, ethylene/propylene rubber compounded for cure with a free-radical source and a nitrogen oxide in accordance with the invention may be used to fabricate pneumatic tires or parts thereof (e.g. tread, carcass, sidewall) in the conventional manner, followed by heating to effect the cure. Shoes, hose, clothing, belts, floor coverings, molded goods and mechanical goods of all sorts, with or without reinforcement such as textile or wire reinforcement, may be made from compositions compounded for cure in accordance with the invention. Coated fabrics of particular utility may be made in this manner. Blown or expanded articles may be made by including a blowing agent in the composition. The composition may be shaped by extrusion, calendering, molding, or any other suitable method. The composition may be blended with other materials, such as resins or rubbers (e.g., butyl rubber).

Having thus described our invention, what we claim and desire to protect by Letters Patent is:

1. In a method of curing ethylene/propylene copolymer rubber by heating said copolymer rubber in the admixture with a free-radical source and a promoter, the improvement comprising employing as the said promoter a nitrogen oxide selected from the group consisting of nitric oxide and nitrogen dioxide, adsorbed on a solid, finely divided support.

2. A method as in claim 1, in which the said free-radical source is an organic peroxide.

3. A method as in claim 1, in which the said free-radical source is dicumyl peroxide.

References Cited in the file of this patent

UNITED STATES PATENTS 3,088,930    Cain et al. _____ May 7, 1963
3,093,614    Muckenzie _____ June 11, 1963

FOREIGN PATENTS 886,897    Great Britain _____ Jan. 10, 1962